H. WEHNER.
DEVICE FOR SEPARATING GASES FROM HOT WATER.
APPLICATION FILED JULY 31, 1914.

1,399,592. Patented Dec. 6, 1921.

WITNESSES.

INVENTOR.
HEINRICH WEHNER
by
Attorney.

UNITED STATES PATENT OFFICE.

HEINRICH WEHNER, OF FRANKFORT-ON-THE-MAIN, GERMANY.

DEVICE FOR SEPARATING GASES FROM HOT WATER.

1,399,592.  Specification of Letters Patent.  Patented Dec. 6, 1921.

Application filed July 31, 1914. Serial No. 854,321.

(GRANTED UNDER THE PROVISIONS OF THE ACT OF MARCH 3, 1921, 41 STAT. L., 1313.)

*To all whom it may concern:*

Be it known that I, HEINRICH WEHNER, a citizen of the German Empire, residing at Frankfort-on-the-Main, in Germany, have invented certain new and useful Improvements in Devices for Separating Gases from Hot Water, (for which I have made application in Germany, July 31, 1913,) of which the following is a specification.

The object of this invention is to provide improved means for separating gases such as carbon dioxid and oxygen, from water, mainly for the purpose of preventing corrosion of metal with which the water is brought into contact, as for example in hot water heating installations for buildings.

Figure 1:
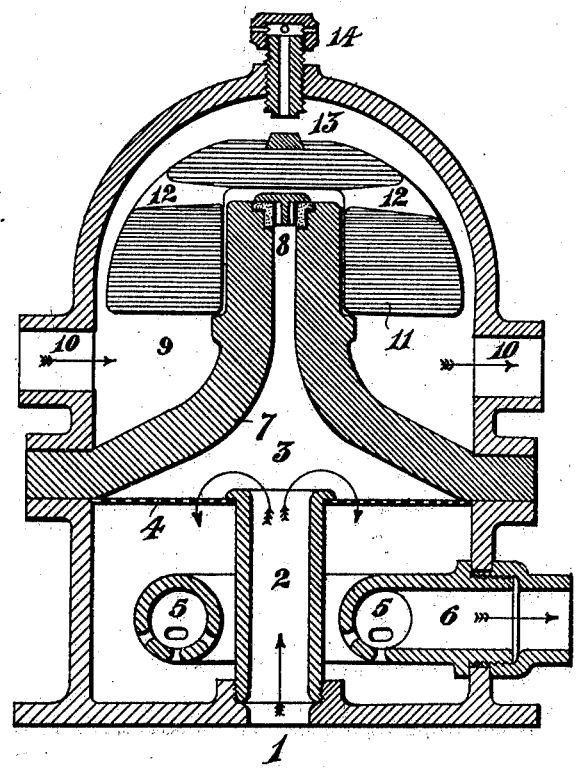
Figure 2:
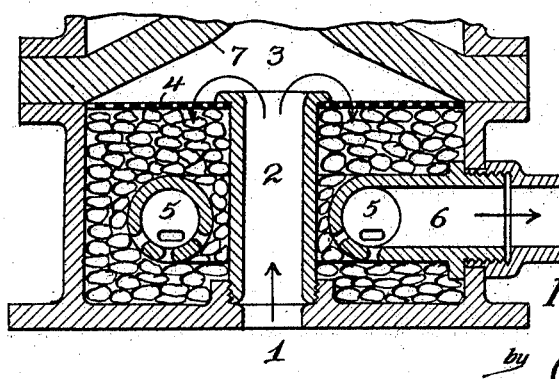

In the accompanying drawing Figure 1 is a vertical section of my apparatus and Fig. 2 is a fragmentary sectional view of a modification.

1 designates the orifice of a water heater or boiler, from which rises a short pipe 2 standing within a chamber 3. In the latter there is a horizontal strainer 4, through which the pipe 2 passes, the pipe terminating just above the said strainer. Below the strainer there is a perforated annular pipe 5, joined to a pipe 6, which passes out of the chamber 3.

The roof 7 of the chamber 3 is funnel shaped, and is closed at the top by an automatic valve 8, opening outward. The roof consists of heat insulating material, such as vulcanite, papier mâché or the like, and is surrounded by a dome-like chamber 9, which has induction and eduction ports 10 for cold water.

Around the tubular part of the roof 7 there is a float 11, having ducts 12 enabling steam and gas to be discharged through the float from the chamber 3 when the valve 8 is open. When the float 11 is lifted it acts as a valve closing the lower orifice of a short discharge pipe 13 leading out of the chamber 9. This discharge pipe can be closed by means of a screw cap 14.

The action of the device is as follows:

Water from the boiler or heater, carrying gas in the form of minute bubbles, rises through the pipe 2, and is then deflected downward, as indicated by arrows in the drawing, so that it passes through the strainer 4 and into the perforated pipe 5, from which it is discharged through the pipe 6. The minute bubbles of gas are retained by the strainer 4, to which they adhere until in course of time they merge into larger bubbles having sufficient buoyancy to detach themselves and rise.

I may increase the efficiency of the device, for retaining gas bubbles, by partly filling the space below the strainer with neutral granular slag, quartz or other insoluble material, as shown in Fig. 2.

The gas which is liberated by the bubbles detached from the strainer 4 rises, together with steam, through the tubular part of the roof 7, and passes through the ducts 12 into the chamber 9, the steam being condensed by contact with the cold float and walls of the chamber 9. That part of the gas (chiefly carbon dioxid, oxygen and nitrogen) which is not absorbed by the condensate and the cold water flowing through the chamber 9, accumulates in the upper part of the said chamber until its pressure is sufficient to depress the float 11 and open the lower orifice of the pipe 13, through which the gas escapes, allowing the float to rise again and close the pipe 13 until the pressure under the dome again depresses the float.

What I claim as my invention and desire to secure by Letters Patent of the United States is:—

1. In apparatus for the purpose set forth, the combination of a chamber having an inlet and an outlet for hot water, a strainer in said chamber, a second chamber having an inlet and an outlet for cold water and an outlet for gas, a partition between said chambers, having an orifice enabling steam and gas to pass from the first mentioned chamber to the second mentioned chamber, and a float in the second mentioned chamber, adapted to close the gas outlet of said chamber and to be removed from said outlet by gas accumulating in said chamber.

2. In apparatus for the purpose set forth, the combination of a chamber having an inlet and an outlet for hot water, a strainer in said chamber, a second chamber having an inlet and an outlet for cold water and an outlet for gas, a heat insulating partition between said chambers, having an orifice enabling steam and gas to pass from the first mentioned chamber to the second mentioned chamber, and a float in the second mentioned chamber, adapted to close the gas outlet of said chamber and to be removed from said outlet by gas accumulating in said chamber.

3. In apparatus for the purpose set forth, the combination of a hot water chamber having a roof of heat insulating material, said roof having an orifice, an outwardly opening valve in said orifice, a strainer in said chamber, an inlet pipe extending through said strainer, an outlet pipe below said strainer, a cold water chamber above said roof, having a gas discharge orifice, and a float in said cold water chamber, adapted to close said gas discharge orifice.

In witness whereof I have signed this specification in the presence of two witnesses.

HEINRICH WEHNER.

Witnesses:
JEAN GRUND,
CARL GRUND.